Patented Aug. 3, 1954

2,685,576

UNITED STATES PATENT OFFICE 2,685,576

LOW-TEMPERATURE EMULSION POLYMERIZATION EMPLOYING HYDROCARBON ADDITIVES

Charles F. Fryling, Phillips, and Archie E. Follett, Borger, Tex., assignors to Phillips Petroleum Company, a corporation of Delaware No Drawing. Application December 26, 1950, Serial No. 202,804

14 Claims. (Cl. 260—84.1)

This invention relates to the low-temperature polymerization of unsaturated organic compounds while dispersed in an aqueous emulsion. In some of its preferred aspects the invention relates to the employment of novel hydrocarbon additives in highly activated recipes used at low polymerization temperatures for effecting production of synthetic rubber by emulsion polymerization of conjugated diolefins.

Numerous recipes have been developed for carrying out emulsion polymerization reactions at low temperatures. Highly activated recipes, such as those of the redox type, have been frequently employed. The materials which have been suggested as oxidizing and reducing components in redox emulsion polymerization systems are numerous and varied. Heavy metal salts, such as soluble ferrous salts, have been employed as reductants and among the oxygen-giving materials such compounds as persulfates, peroxides, and hydroperoxides are now well known. It is also frequently preferred to include an organic reducing agent such as a sugar or other readily oxidizable polyhydroxy compound in the polymerization recipe although in many instances satisfactory results are realized in the absence of this component.

Differing kinds of polymerization reactions have been effected in the presence of various types of additives for the purpose of accomplishing different results. Low boiling hydrocarbons have been used to aid in temperature control in polymerizations wherein alkali metals are employed as catalysts, and liquefied, normally gaseous hydrocarbons, as well as certain halogenated materials, are frequently considered advantageous when catalysts of the Friedel-Crafts type, such as $BF_3$ and $AlCl_3$ are used. Starkweather in U. S. Patent 2,234,204 has disclosed that various nonpolymerizable compounds, including saturated aliphatic and aromatic hydrocarbons, and especially carbontetrachloride and other halogenated compounds, may be present in polymerizations carried out at 20 to 100° C., and preferably at 50 to 70° C., but states that at lower temperatures the reaction is usually too slow.

An object of this invention is to effect polymerization of organic compounds in aqueous emulsion at temperatures below ordinary room temperature. Another object of the invention is to provide a new type of recipe for the low temperature emulsion polymerization of conjugated diolefins. A further object is to polymerize conjugated diolefins in aqueous emulsion to produce synthetic rubbers, at temperatures not higher than 15° C. and as low as —40° C. Yet another object is to effect such polymerization under novel conditions producing very little or no gel. A further object is to provide new additives useful in the low temperature emulsion polymerization of unsaturated organic compounds, which permits essentially complete conversion in reasonable time and without the occurrence of precoagulation. Still another object is to enable the carrying out of low temperature emulsion polymerizations of conjugated diolefins to form synthetic rubbers, in the absence of or in the presence of less than usual quantities of conventional modifiers, such as mercaptans. Other objects and advantages of the invention will be apparent, to one skilled in the art, from the accompanying disclosure and discussion.

We have now discovered a process whereby emulsion polymerization reactions can be effected at rapid rates and at low temperatures in the presence of hydrocarbon additives comprising $C_3$ to $C_6$ aliphatic hydrocarbons of both paraffinic and monoolefinic types. The said additives do not form polymers under our particular reaction conditions, but cannot be said to be inert because they greatly affect the nature of the low temperature polymerization system and the properties of the polymeric products. The method comprises the incorporation of the selected hydrocarbon into a highly activated, low temperature recipe, such as an iron pyrophosphate recipe or one in which the activator comprises a polyalkylenepolyamine. The iron pyrophosphate recipes can be of the type which contain an easily oxidizable polyhydroxy compound, such as a sugar, or they can be sugar-free. Catalysts employed in these systems, and also in the iron-free polyalkylenepolyamine recipes, are preferably organic hydroperoxides, and especially trisubstituted hydroperoxymethanes containing not to exceed 30 carbon atoms per molecule.

When operating according to the method of this invention substantially complete conversion is readily attained and the latices produced are free from gelation and precoagulation. In conventional polymerization systems, i. e., systems which do not contain a hydrocarbon additive as herein described, large quantities of gel are frequently formed at high conversions, say above 60 or 70 per cent. By regulating the amount of additive and the modifier, if such is included, fluid latices which yield elastomers of high or low Mooney[1] values are readily obtained. The process of this invention can be operated very satisfactorily in the absence of conventional modifiers, such as mercaptans and even in such instances there is freedom from gelation and precoagulation. Polymers produced in the absence of mercaptan modifiers have very high molecular weights as evidenced by inherent viscosity values. It is to be noted, however, that with increasing amounts of hydrocarbon additive polymers of decreasing inherent viscosity are obtained. In instances where a mercaptan modifier is employed, a smaller quantity is required to produce a polymer of a given Mooney value if the polymerization system contains a hydrocarbon additive. It is possible when copolymerizing a conjugated diolefin, such as 1,3-butadiene, with styrene in the present process to regulate, within certain limits, the ratio of reacted conjugated diolefin to styrene in the polymer by regulating the amount of the $C_3$ to $C_6$ hydrocarbon additive present in the polymerization recipe. When operating conditions are regulated in such a manner that complete conversion of the styrene is realized, the styrene stripping and recovery steps can be eliminated. One variation in procedure which also aids in obtaining complete conversion of styrene is the incremental addition of the conjugated diolefin toward the end of the polymerization process.

The additives which are applicable in this invention are the paraffins and monoolefins having from three to six carbon atoms per molecule, and having either straight or branched carbon chains. All of the hydrocarbons in this group are well known to those skilled in the art, but, some of the more common ones will be mentioned by way of example: propane, propylene, isobutane, normal butane, isobutylene, butene-1, butene-2 (either cis or trans or mixtures thereof), isopentane, normal pentane, the dimethylbutanes, the methylpentanes, normal hexane, the normal pentenes, the various methylbutenes and methylpentenes. One or a mixture of these hydrocarbon additives can be used in a polymerization reaction mixture in accordance with this invention. The ratio of the total amount of the hydrocarbon additive or additives to the total amount of the monomer or monomers, in parts by weight, range from 1:0.5 to 1:10, with the preferred range being from 1:1.5 to 1:3.

An important feature of our invention is the initiation and partial completion of the low-temperature polymerization reaction in the absence of our additives, followed by addition of same in one or more increments and continuation of the polymerization in the presence of the thus-added material. Ordinarily when operating by this method the polymerization is carried to a numerical value of the percentage conversion which is say 10 per cent (based on 100 per cent total conversion) lower than that value at which gelation would begin to occur if the polymerization were continued normally; at this point part or all of the desired quantity of hydrocarbon additive is introduced and the conversion continued into the normally gel-forming range but without the production of appreciable quantities of gel. The conversion can be carried to essential completion or stopped at some point short thereof. By way of example, polymerization of a particular recipe which begins to show gel formation at 60 per cent conversion is carried to 50 per cent conversion without any hydrocarbon additive, and then a weight of normal butane equal to the weight of initial monomer is added and the polymerization carried to say 75 per cent conversion without gelation at which time the polymerization is stopped and the polymer recovered by known means. The 75 per cent conversion is obtained by this method in a shorter time than if the butane were present during the entire polymerization period, because, as shown below, the additive does slow the reaction rate to some extent. However, it is surprising that it is possible to effect the polymerization at all at these low temperatures in the presence of such added hydrocarbons which necessarily reduce the concentration of the monomer in the reaction system. Thus it is an important feature of our invention that we have discovered the possibility of low-temperature emulsion polymerization in the presence of the stated non-polymerizing hydrocarbon additives and the very beneficial effects upon the system and products obtainable thereby. As an alternative to the above-described procedure of polymerizing first without and then with the additive, we can initiate reaction with some additive present and then gradually increase the quantity of additive in the emulsion polymerization reaction mixture by either continuous or incremental addition of additive thereto.

The polymerizations of this invention are effected at temperatures not above 15° C., and preferably below 0° C. The temperature can be as low as −40° C., and sometimes even lower. It is frequently desirable to include water-soluble components in the aqueous phase, particularly in order to depress the freezing point when the polymerization temperature is below the normal freezing point of water. Inorganic salts and alcohols can be so used. Examples of suitable salts are those of ammonium, and alkali and alkaline earth metals, including chlorides, nitrates, sulfates, etc. Alcohols which are applicable comprise water-soluble compounds of both monohydric and polyhydric types, including methanol, ethylene glycol, glycerol and erythritol by way of example.

It is generally preferred that the emulsion be of an "oil in water" type, with the ratio of aqueous medium to monomeric material between about 0.5:1 and about 2.75:1, in parts by weight. It is frequently desirable to include water-soluble components in the aqueous phase, particularly when the polymerization temperatures are below freezing. Inorganic salts and alcohols can be so used as indicated hereinabove. The amount of alcoholic ingredient used in a polymerization recipe must be sufficient to prevent freezing of the aqueous phase and generally ranges from 20 to 80 parts per 100 parts of monomers charged. In most cases the amount of water employed is sufficient to make the total quantity of the alcohol-water mixture equal 150

---

[1] By "Mooney value" is meant the numerical value of the "Mooney viscosity" or as sometimes termed "Mooney plasticity" determined by ASTM Method D927–47T, February 1949, ASTM Committee D-11. This measurement was first described by Mooney in Industrial and Engineering Chemistry, Analytical Edition, vol. 6, pp. 147–151 (1934), and is a measure of the shearing force, at a specified temperature and after a definite period of shearing, obtained when a roughened disk is rotated within a sample of the raw polymer held in a surrounding stator.

to 200 parts. In cases where it is desired to use a larger quantity of the alcohol-water mixture, say around 250 parts, the amount of alcohol can be increased to as much as 120 parts. It is preferred that the alcohol be such that it is substantially insoluble in the non-aqueous phase, and that 90 per cent, or more, of the alcohol present be in the aqueous phase. A high-boiling alcohol such as glycerine is difficult to recover from the resulting serum; a low-boiling alcohol such as methanol is easily removed and frequently preferred. Other aliphatic alcohols which are higher-boiling than methanol, such as propanol, are frequently less satisfactory. In the practice of the invention suitable means will be necessary to establish and maintain an emulsion and to remove reaction heat to maintain a desired reaction temperature. The polymerization can be conducted in batches, semicontinuously, or continuously. The total pressure on the reactants is preferably at least as great as the total vapor pressure of the mixture, so that the initial reactants will be present in liquid phase. Usually 50 to 98 per cent of the monomeric material is polymerized.

The principles of this invention are applicable to certain polymerization recipes which produce "high solids" latices, i. e. latices resulting from the use of smaller amounts of aqueous medium than are generally used in conventional polymerization procedures.

Emulsifying agents which are applicable in these low temperature polymerizations are materials such as potassium laurate, potassium oleate, and the like, and salts of rosin acids. Particularly useful are the specific mixtures of salts of fatty acids and of rosin acids, which seem to have a synergistic action when used with some of these same hydroperoxides, as more fully disclosed and claimed by Charles F. Fryling and Archie E. Follett in their application Serial No. 72,534, filed January 24, 1949. However, other emulsifying agents, such as nonionic emulsifying agents, salts of alkyl aromatic sulfonic acids, salts of alkyl sulfates, and the like which will produce favorable results under the conditions of the reaction, can also be used in practicing the invention, either alone or in admixture with soaps. The amount and kind of emulsifier used to obtain optimum results is somewhat dependent upon the relative amounts of monomeric material and aqueous phase, the reaction temperature, and the other ingredients of the polymerization mixture. Usually an amount between about 0.3 and 5 parts by weight per 100 parts of monomeric material will be found to be sufficient.

The pH of the aqueous phase can be varied over a fairly wide range without producing unduly deleterious effects on the conversion rate or the properties of the polymer. In general the pH can be within the range of 9.0 to 12.0 and it may be advantageous to have a pH higher than 12.0 in some instances.

When carrying out polymerization reactions according to the process of this invention, it is frequently considered desirable to include an electrolyte in the system, such as potassium chloride, trisodium phosphate, or other salt which will not produce deleterious effects. One function of an electrolyte is to increase the fluidity of the latex, and it also reduces precoagulation. Generally the amount of such salt will not exceed one part by weight per 100 parts of monomers.

Excellent conversion rates can be obtained in our low temperature emulsion polymerization systems through the use of activator-reductants comprising hydrazine or polyalkylene polyamines together with oxidizing components comprising trisubstituted hydroperoxymethanes, these latter components being employed as initiators, or catalysts, for the polymerization. These recipes afford a means for effecting the polymerizations in the absence of heavy metal salt activators if desired.

The preferred polyalkylene polyamines are the ethylene polyamines and the trimethylene polyamines, as well as the carbamates of these materials. The ethylene polyamines can be compounds such as ethylenediamine, diethylenetriamine, aminoethylethanolamine, ethylenemethylethylenetriamine, tetraethylenepentamine, and the like. These compounds have the general formula RHN(CHXCHXNH)$_m$(CHXCHX)$_n$NHR where each R contains not more than eight carbon atoms and is of the group consisting of hydrogen, aliphatic, cycloaliphatic, aromatic, olefinic, and cycloolefinic radicals, and each X contains not more than three carbon atoms and is of the group consisting of hydrogen and aliphatic radicals, $m$ is an integer between 0 and 8, inclusive, and $n$ is an integer of the group consisting of 0 and 1 and is 1 when $m$ is greater than 0. Each of the foregoing radicals (other than hydrogen) can be completely hydrocarbon in character, and can be of mixed character when containing six or more carbon atoms, such as alkylcycloalkyl, aralkyl, alkaryl groups, and the like, and can also have non-hydrocarbon substituents, some of which will have the effect of making them more water-soluble and less oil (hydrocarbon)-soluble; particularly useful non-hydrocarbon substituents include oxygen in the form of hydroxy and ether compounds, sulfur in similar compounds (i. e. mercapto compounds and thioethers) and halogen compounds. Carbamates of each of the foregoing are also useful.

The trimethylene polyamines, also referred to as 1,3-diaminopropanes, employed in the polymerization systems herein described are preferably those represented by the formula

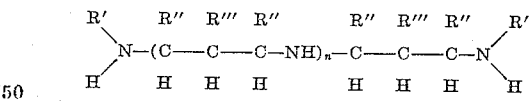

where each R' is one of the group consisting of hydrogen, methyl, ethyl, hydroxymethyl, hydroxyethyl, and carboxyl radicals, each R'' is hydrogen or methyl, and each R''' is hydrogen, methyl, or an activating substituent of the group consisting of —OR, —SR, —NR$_2$, —CN, —SCN, —COOR, —CHO, with R being hydrogen, methyl, ethyl, n-propyl, or isopropyl, or —CHR'''— can be C=O and $n$ is an integer between 0 and 8, inclusive. In order to obtain optimum results, the polyamino compound must be of such nature that substantial amounts are present in the aqueous phase. The distribution of the polyamino compound between the aqueous and oil phases appears to be an important factor in determining the extent of the activating effect of a given compound. In other words, if a major portion of the polyamino compound is in the aqueous phase, the compound will generally be more effective as an activator than when a material of greater oil solubility is employed.

Of the trimethylene polyamines, we much prefer to use the compounds containing a single trimethylene group together with its two terminal amine groups. The simplest of these trimethylene polyamines, or 1,3-diaminopropanes, is 1,3-diaminopropane itself. This compound is also known as trimethylenediamine. Substitution of an —OH or a =O on the central carbon atom of 1,3-diaminopropane appears to enhance the activity in the emulsion polymerization recipes, hence 1,3-diaminoacetone and 1,3-diamino-2-propanol are at present the most preferred compounds of our invention. Other 1,3-diaminopropanes, which contain a plurality of trimethylene (unsubstituted or substituted) groups alternating with amine groups, and which are regarded as polymers of the parent compound, can also be employed; for example tri(trimethylene)-tetramine (sometimes erroneously designated as tripropylenetetramine) is considered to be a polymer of trimethylenediamine. All of the trimethylene polyamine compounds of our invention have the basic structure of 1,3-diaminopropane and hence can be broadly referred to as "1,3-diaminopropane and its derivatives and polymers thereof"; they can also be broadly referred to as "1,3-diaminopropanes," and also as "trimethylene polyamines." As indicated hereinabove, it is preferred to use only those which come within the structural formula defined in the preceding paragraph, and all of the compounds so defined are operable in our process to some extent though it will of course be appreciated that the relative activities and efficacies will vary considerably depending upon the size of the molecule and the various constitutents thereof, as well as upon the other components and their proportions in the various recipes which may be used. Those skilled in the art will readily ascertain any of the specific compounds which are within the scope of the structural formula. However, by way of example the following are mentioned: 1,3-diaminopropane, 1,3-diaminoacetone, 1,3-diamino-2-propanol, N,N'-dimethyl-1,3-diaminoacetone, N-ethoxy-1,3-diamino-2-propanol, 1,3-diamino-2-carboxypropane, 1,3-diamino-2 - (dimethylamino) - propane, 2,4 - diaminopentane, 1,3-diamino-2-cyanopropane, 1,3-diamino-2 - mercaptopropane, di(trimethylene)triamine, tri(trimethylene)tetramine, tetra(trimethylene)pentamine, polytrimethylene polyamines in which the amino and trimethylene groups can be substituted as previously mentioned, and carbamates of each of the foregoing.

It is to be understood that each of the foregoing polyamino compounds is by no means necessarily the equivalent of the others, as various types and even individuals within types are found to have characteristics differing to a greater or less extent in low temperature emulsion polymerization recipes.

In the polymerization systems of this invention, the polyamino compounds appear to act as activator and reductant, and no other activating ingredients, such as compounds of polyvalent-multivalent metals, or reducing ingredients, such as a reducing sugar, need be present in order to obtain satisfactory and rapid polymerization of the monomeric material, even at sub-freezing temperatures.

The amount of polyamino compound used to obtain optimum results is dependent upon other ingredients in the recipe. Preferred results are usually obtained with between 0.02 to 5 parts by weight of the polyamino compound per 100 parts of monomeric material.

The oxidizing components used in these recipes are preferably trisubstituted hydroperoxymethanes, also hereinafter referred to as hydroperoxides. These compounds are represented by the formula

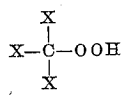

wherein each X, individually, is one of the group consisting of aliphatic, cycloaliphatic, aromatic, olefinic, and cycloolefinic radicals. Each of these radicals can be completely hydrocarbon in character, and can be of mixed character such as aralkyl, alkaryl, and the like, and can also have non-hydrocarbon substituents; particularly useful non-hydrocarbon substituents include oxygen in the form of hydroxy and ether compounds, sulfur in similar compounds (i. e. mercapto compounds and thioethers), and halogen compounds. Such hydroperoxides can be easily prepared by simple oxidation, with free oxygen, of the corresponding hydrocarbon or hydrocarbon derivative, i. e. of the parent trisubstituted methane. If desired the hydroperoxides can be used in the form of their alkali metal salts. Among the preferred trisubstituted hydroperoxy methanes are those containing from 10 to 30 carbon atoms per molecule, as disclosed and claimed in copending application Serial No. 107,638, filed July 29, 1949. Further examples of suitable hydroperoxides which can be used are: trialkyl hydroperoxymethane having from 6 to 9 carbon atoms per molecule, alkenyl trisubstituted hydroperoxymethanes having from 6 to 30 carbon atoms, hydroperoxides of octahydrophenanthrene and its derivatives, hydroperoxides of alkyl tetralins and their derivatives, aryl cyclohexyl hydroperoxides, tertiary butyl hydroperoxide. In addition to or instead of hydroperoxides, organic peroxides can be used as the oxidant material, benzoyl peroxide being perhaps the most widely used of the many organic peroxides known. In general, when the material acting as an oxidant in our recipes is a peroxidic-type material, it can be generically described by the formula R'OOR'' where R' is one of the group alkyl, aryl, acyl, aralkyl, and cycloalkyl and R'' is one of the group hydrogen, alkyl, aryl, acyl, aralkyl, and cycloalkyl; the named hydrocarbon radicals can also contain olefinic bonds in an aliphatic chain and/or be substituted by non-hydrocarbon groups as indicated hereinabove in more detail with respect to the trisubstituted hydroperoxymethanes.

The amount of hydroperoxymethane used to obtain an optimum reaction rate will depend upon the polymerization recipe used and upon the reaction conditions. The amount is generally expressed in millimols per 100 parts of monomeric material, using in each instance the same units of weight throughout, i. e. when the monomeric material is measured in pounds the hydroperoxymethane is measured in millipound mols. The same is true for other ingredients in the polymerization recipe. An optimum rate of polymerization is usually obtained with the amount of hydroperoxymethane between 0.1 and 10 millimols per 100 parts by weight of monomeric material.

In other recipes a composition is used which comprises one compound which is an oxidation catalyst, or activator, and another different compound which is a reductant. The oxidation catalyst is generally selected from a group of materials consisting of compounds of metals such as iron, maganese, copper, vanadium, cobalt, etc. In general it is assumed that the metal must be a multivalent metal and in such a condition that it can change its valence state reversibly. The other ingredient ordinarily present is a reductant, and is usually an organic material such as a reducing sugar or other easily oxidizable polyhydroxy compound. Compounds frequently employed in this capacity are glucose, levulose, sorbose, invert sugar, and the like. The multivalent metal ion of the oxidation catalyst can easily and readily pass from a low valence state to a higher valence state, and vice versa. Sometimes this compound, when present in its lower valence state, can function in the dual role of reductant and oxidation catalyst. One commonly used oxidation catalyst is an iron pyrophosphate, and is separately made up in aqueous solution from a ferrous salt, such as ferrous sulfate, and a pyrophosphate of an alkali metal, such as sodium or potassium.

When a ferrous pyrophosphate activator is used, it is preferably prepared by admixing a ferrous salt, such as ferrous sulfate, with a pyrophosphate of an alkali metal, such as sodium or potassium, and water and heating this mixture, preferably for the length of time required for maximum activity. A reaction occurs between the salts, as evidenced by the formation of a grayish-green precipitate at sufficiently high concentrations of ingredients. When preparing the activator the mixture is generally heated above 50° C., for variable periods depending upon the temperature. For example, if the mixture is boiled, a period of twenty minutes or less is sufficient to produce the desired activity, and the time of boiling may even be as low as 30 seconds. One convenient method of operation involves maintaining the temperature of the activator solution at about 60° C. for a period of heating ranging from 10 to 30 minutes. Prior to heating the activator mixture the vessel is usually flushed with an inert gas such as nitrogen. In general it is preferred to heat the mixture below the boiling point, say at a temperature around 55 to 75° C.

In cases where the activator is prepared just prior to use, it is generally employed in the form of an aqueous dispersion as described above. However, the solid activator may be isolated and the crystalline product used, and in this form it is preferred in some instances. Subsequent to heating the activator mixture, it is cooled to around room temperature and the solid material separated by centrifugation, filtration, or other suitable means, after which it is dried. Drying may be accomplished in vacuo in the presence of a suitable drying agent, such as calcium chloride, and in an inert atmosphere such as nitrogen. When using this crystalline product in emulsion polymerization reactions, it is generally charged to the reactor just prior to introduction of the butadiene. This crystalline material is believed to be a sodium ferrous pyrophosphate complex, such as might be exemplified by the formula $2Na_2FeP_2O_7 \cdot Na_4P_2O_7$, or perhaps $Na_2FeP_2O_7$. In any event the complex, whatever its composition, is only slightly soluble in water and is one active form of ferrous ion and pyrophosphate which can be successfully used in our invention. It may be incorporated in the polymerization mixture as such, or dissolved in sufficient water to produce solution. Other forms of multivalent metal and pyrophosphate may also be used, so long as there is present in the reacting mixture a soluble form of a multivalent metal, capable of existing in two valence states and present primarily in the lower of two valence states, and a pyrophosphate.

As previously stated, it is usually desirable that the multivalent metal be present in its lower valence state. With some recipes, it is unnecessary to include an organic reducing agent either in the activator solution or in the polymerization mixture. However, particularly at temperatures above 32° F., a faster reaction is sometimes obtained with some recipes when a small amount of an organic reducing agent, such as a reducing sugar, is included in the polymerization recipe, and it is frequently more desirable to incorporate this in the reaction system by first including it in the activator solution along with the other ingredients. When the multivalent ion is present in its higher valence state, it is usually necessary to include in the activator solution an organic reducing agent. As a result of the multivalent ion will be partially reduced and a substantial amount of the multivalent ion will be present in its lower valence state when the activator solution is ready for addition to the polymerization mixture.

The amounts of activator ingredients are usually expressed in terms of the monomers charged. The multivalent metal should be within the range of 0.10 to 3 millimols per 100 parts by weight of monomers, with 0.2 to 2.5 millimols being generally preferred. The amount of pyrophosphate should be within the range of 0.10 to 5.6 millimols based on 100 parts by weight of monomers; however, the narrower range of 0.2 to 2.5 millimols is more frequently preferred. The mol ratio of ferrous salt to alkali metal pyrophosphate can be between 1:0.2 and 1:3.5, with a preferred ratio between 1:0.35 and 1:2.8.

In effecting emulsion polymerization of a monomeric material, particularly when a batch-type or semi-batch-type operation is carried out, the reactor is usually first charged with the aqueous medium, which contains the desired emulsifying agent, and the monomeric material is then admixed with agitation of the contents. At the same time a reaction modifier, such as a mercaptan, is also included, usually in solution in at least a part of the monomeric material. An activator solution and an oxidant are separately added to the reaction mixture, and reaction then proceeds. A preferred manner of adding these two constituents is usually to have the activator solution incorporated in the aqueous medium prior to addition of the monomeric material, and to add the oxidant as the last ingredient. Sometimes, however, satisfactory polymerization results can be obtained when this procedure is reversed. It is also sometimes the practice to add portions of one or the other of the activator solutions and oxidant intermittently, or continuously, during the course of the reaction. If the operation is carried out continuously, streams of the various ingredients are admixed in somewhat the same order prior to their final introduction into the polymerization reaction zone.

This invention is applicable to emulsion polymerizations which form synthetic rubbers when the monomeric material polymerized is a polymerizable aliphatic conjugated diolefin or a mixture of such a conjugated diolefin with lesser amounts of one or more other compounds containing an active $CH_2=C<$ group which are copolymerizable therewith such as aryl olefins, acrylic and substituted acrylic acids, esters, nitriles and amides, methyl isopropenyl ketone, vinyl chloride, and similar compounds mentioned hereinbelow. In this case the products of the polymerization are high molecular weight linear polymers and copolymers which are rubbery in character and may be called synthetic rubber. Often preferred as reactants are conjugated dienes having not more than six carbon atoms per molecule. Although, as can be readily deduced from the foregoing, there is a host of possible reactants, the most readily and commercially available monomers at present are butadiene itself (1,3-butadiene) and styrene. The invention will, therefore, be more particularly discussed and exemplified with reference to these typical reactants. With these specific monomers, it is usually preferred to use them together, in relative ratios of butadiene to styrene between 65:35 and 90:10 by weight.

The monomeric material polymerized to produce polymers by the process of this invention comprises unsaturated organic compounds which generally contain the characteristic structure $CH_2=C<$ and, in most cases, have at least one of the disconnected valences attached to an electronegative group, that is, a group which increases the polar character of the molecule such as a chlorine group or an organic group containing a double or triple bond such as vinyl, phenyl, cyano, carboxy or the like. Included in this class of monomers as at least one of the ingredients of our synthetic rubber recipes are the conjugated butadienes or 1,3-butadienes, for example butadiene (1,3-butadiene), 2,3-dimethyl-1,3-butadiene, isoprene, piperylene, 3-furyl-1,3-butadiene, 3-methoxy-1,3-butadiene, the haloprenes including chloroprene (2-chloro-1,3-butadiene), bromoprene, methyl chloroprene (2-chloro-3-methyl-1,3-butadiene), and the like. Materials which can, if desired, be copolymerized with the butadiene component include aryl olefins such as styrene, various alkyl styrenes, p-chloro-styrene, p-methoxy-styrene, alpha-methylstyrene, vinylnaphthalene and similar derivatives thereof, and the like; acrylic and substituted acrylic acids and their esters, nitriles and amides such as acrylic acid, methacrylic acid, methyl acrylate, ethyl acrylate, methyl alpha-chloro-acrylate, methyl methacrylate, ethyl methacrylate, butyl methacrylate, methyl ethacrylate, acrylonitrile, methacrylonitrile, methacrylamide and the like, methyl isopropenyl ketone, methyl vinyl ketone, methyl vinyl ether, vinylethinyl alkyl carbinols, vinyl acetate, vinyl chloride, vinylidene chloride, vinylfurane, vinylcarbazole, vinylacetylene and other unsaturated hydrocarbons, esters, alcohols, acids, ethers, etc., of the types described. In any event, the monomer or monomers, and the reaction conditions, are chosen to produce a rubbery product, as contrasted with resins.

In preparing synthetic rubber by polymerizing conjugated dienes by the process of this invention, it is sometimes desirable to use a polymerization modifying agent, which is usually done in other polymerizations to produce synthetic rubber. Preferred polymerization modifiers for use in the process of the present invention are alkyl mercaptans, and these may be of primary, secondary, or tertiary configurations, and generally range from $C_8$ to $C_{16}$ compounds, but may have more or fewer carbon atoms per molecule. Mixtures or blends of mercaptans are also frequently considered desirable and in many cases are preferred to the pure compounds. The amount of mercaptan employed will vary, depending upon the particular compound or blend chosen, the operating temperature, the freezing point depressant employed, the amount of and the particular hydrocarbon additive used, and the results desired. In general, the greater modification is obtained when operating at low temperatures and therefore a smaller amount of mercaptan is added to yield a product of a given Mooney value, than is used at higher temperatures. In the case of tertiary mercaptans, such as tertiary $C_{12}$ mercaptans, blends of tertiary $C_{12}$, $C_{14}$, and $C_{16}$ mercaptans, and the like, satisfactory modification when using no hydrocarbon additive is obtained with 0.05 to 3.0 part mercaptan per 100 parts monomers, but smaller or larger amounts can be employed in some instances. In accordance with the present invention, less than the normal quantity of mercaptan is used. Thus, a preferred range of mercaptan is from 0 to 0.5 part per 100 parts monomers.

Advantages of this invention are illustrated by the following examples. The reactants, and their proportions, and the other specific ingredients of the recipes are presented as being typical and should not be construed to limit the invention unduly.

Example I

The following polymerization recipe was employed for the preparation of a butadiene/styrene copolymer at $-10°$ C.:

|  | Parts by weight |
|---|---|
| Butadiene | 70 |
| Styrene | 30 |
| n-Butane | Variable |
| Water | 192 |
| Methanol | 48 |
| Potassium laurate | 3 |
| Potassium myristate | 3 |
| Tert-butylisopropylbenzene hydroperoxide | 0.156 |
| $Na_4P_2O_7.10H_2O$ | 0.446 |
| $FeSO_4.7H_2O$ | 0.278 |
| KCl | 0.25 |

The n-butane content was varied from 0 to 50 parts. It is to be noted that no mercaptan modifier was employed and that the inherent viscosity values are relatively high; however, with increasing amounts of the hydrocarbon additive there is a decrease in inherent viscosity. It is also to be noted that with increasing amounts of n-butane, the styrene content of the polymer is increased. All the latices were viscous but substantially gel free. Conversions were determined by complete coagulation of the latex. The following results were obtained:

| n-Butane, Parts | Time, Hours | Conversion, Percent | Approximate Time to 60% Conversion | Gel Percent (Benzene Insoluble) | Inherent Viscosity | Styrene in Polymer, Percent |
|---|---|---|---|---|---|---|
| 0 | 2.75 | 62 | 2.66 | 1 | 4.39 | 26.0 |
| 10 | 4.0 | 74 | 3.25 | 0 | 4.32 | 27.5 |
| 20 | 4.0 | 67 | 3.58 | 1 | 4.23 | 27.7 |
| 30 | 4.25 | 64 | 3.99 | 0 | 3.96 | 26.6 |
| 40 | 4.5 | 63 | 4.28 | 1 | 3.65 | 28.4 |
| 50 | 5.0 | 61 | 4.92 | 1 | 3.44 | 30.7 |

In contrast to the above results, a polymerization run was made using 50 parts n-butane in a conventional GR–S system. The following recipe was employed:

|  | Parts by weight |
|---|---|
| Butadiene | 72 |
| Styrene | 28 |
| Soap flakes | 5 |
| Water | 180 |
| Potassium persulfate | 0.3 |
| Primary dodecyl mercaptan | 0.4 |
| n-Butane | 50 |

Polymerization was effected at a temperature of 50° C. Two additional runs were made, one containing 25 parts n-butane and the other, a control without n-butane. The following results were obtained:

| n-Butane, Parts | Conversion, Percent 24.5 Hours | Gel, Percent |
|---|---|---|
| 25 | 89 | 21.4 |
| 50 | 58 | 29.6 |
| 0 | 93 | 46.6 |

When polymerization is carried to only 60 per cent conversion in this same GR–S system, a polymer that is substantially gel free is obtained.

Example II

Eleven polymerizations were effected at −10° C. with the total organic phase (monomers plus hydrocarbon additive) being held constant but varying the ratios of the ingredients in this phase. The following basic recipe was employed:

|  | Parts by weight |
|---|---|
| Monomers | variable ⎱ total 100 |
| n-Butane | variable ⎰ parts |
| Water | 192 |
| Methanol | 48 |
| Potassium laurate | 3 |
| Potassium myristate | 3 |
| Mercaptan blend [1] | variable (for 50 Mooney polymers) |
| Tert-butylisopropylbenzene hydroperoxide | 0.208 |
| $FeSO_4 \cdot 7H_2O$ | 0.278 |
| $Na_4P_2O_7 \cdot 10H_2O$ | 0.446 |
| KCl | 0.25 |

[1] A blend of tertiary $C_{12}$, $C_{14}$, and $C_{16}$ aliphatic mercaptans in a ratio of 3:1:1 parts by weight.

For convenience, the n-butane is expressed in terms of 100 parts monomers in the tabulation which follows. The amounts of each ingredient in the organic phase (monomers and n-butane) can be calculated readily to determined the quantities actually charged in the above recipe. The following summation of results was obtained:

| Butadiene/Styrene | n-Butane | Time, Hours | Conversion, Percent | Mercaptan Blend for 50 Mooney |
|---|---|---|---|---|
| 100/0 | 100 | 12.6 | 94 | 0.34 |
| 80/20 | 0 | 12.0 | 99 | 0.45 |
| 80/20 | 50 | 4.5 | 56 | 0.20 |
| 80/20 | 50 | 11.8 | 94 | 0.35 |
| 80/20 | 100 | 4.4 | 58 | 0.16 |
| 80/20 | 100 | 12.0 | 93 | 0.32 |
| 70/30 | 0 | 1.9 | 60 | 0.28 |
| 70/30 | 50 | 4.0 | 58 | 0.19 |
| 70/30 | 50 | 6.5 | 90 | 0.27 |
| 70/30 | 100 | 5.5 | 53 | 0.13 |
| 70/30 | 100 | 11.0 | 93 | 0.22 |

These data show that in comparable polymerizations with increasing amounts of n-butane, a smaller amount of mercaptan is required to produce a 50 Mooney polymer.

Example III

Variable amounts of mercaptan blend were used in a series of polymerizations in which the recipe of Example II was followed. In each run the quantities of butadiene, styrene, and n-butane charged were 46.6, 20.1, and 33.3 parts, respectively. Polymerizations were carried to high conversions to give variable Mooney, substantially gel free polymers. All latices were fluid. The data are as follows:

| Mercaptan Blend, Parts | Time, Hours | Conversion, Percent | Mooney ML-4 | Original | | Milled | | Bound Styrene, Percent |
|---|---|---|---|---|---|---|---|---|
| | | | | Gel, Percent | Inherent Viscosity | Gel, Percent | Inherent Viscosity | |
| 0.15 | 6.5 | 92 | 101 | 0 | 2.30 | 1 | 2.31 | 29.5 |
| 0.20 | 6.5 | 90 | 89 | 1 | 2.19 | 1 | 2.12 | 28.0 |
| 0.25 | 6.5 | 91 | 65 | 0 | 1.88 | 1 | 1.86 | 27.9 |
| 0.30 | 6.5 | 90 | 45 | 1 | 1.66 | 1 | 1.61 | 27.9 |
| 0.35 | 6.5 | 90 | 35 | 1 | 1.49 | 1 | 1.43 | 28.1 |
| 0.40 | 6.5 | 93 | 29 | 1 | 1.36 | 1 | 1.37 | 26.8 |

Example IV

The following recipe was employed for carrying out a series of polymerizations at −10° C. using isobutane, isobutylene, and 1-butene as hydrocarbon additives:

|  | Parts by weight |
|---|---|
| Butadiene | 46.6 |
| Styrene | 20.1 |
| Hydrocarbon additive | 33.3 |
| Water | 192 |
| Methanol | 48 |
| Potassium laurate | 3 |
| Potassium myristate | 3 |
| Mercaptan blend [1] | 0.30 |
| Tert-butylisopropylbenzene hydroperoxide | 0.208 |
| $FeSO_4 \cdot 7H_2O$ | 0.278 |
| $Na_4P_2O_7 \cdot 10H_2O$ | 0.446 |
| KCl | 0.25 |

[1] As in Example II.

A control run was also made using 70 parts butadiene and 30 parts styrene but no hydrocarbon additive. The results are shown below.

| Hydrocarbon Additive | Conversion, Percent | | | Mooney ML-4 |
|---|---|---|---|---|
| | 2.5 Hours | 5.3 Hours | 22.4 Hours | |
| Isobutane | 44 | 73 | 98 | 90 |
| Isobutylene | 46 | 72 | 92 | 87 |
| 1-Butene | 37 | 61 | 85 | 35 |
| None | 50 | 86 | 97 | 112 |

As will be evident to those skilled in the art, various modifications of this invention can be made, or followed, in the light of the foregoing disclosure and discussion, without departing from the spirit or scope of the disclosure or from the scope of the claims.

We claim:

1. A high conversion polymerization process wherein at least 90 per cent of the monomeric material is polymerized in an aqueous medium to produce an essentially gel-free synthetic rubber latex which comprises establishing and maintaining at a polymerization temperature not higher than 15° C. an emulsion comprising an aqueous phase, a liquid monomeric material comprising a major amount of 1,3-butadiene and a minor amount of styrene, an emulsifying agent, and an oxidant-reductant polymerization catalyst composition effective to obtain said polymerization, and at least one hydrocarbon selected from the group consisting of the aliphatic paraffins and monoolefins containing from 3 to 6 carbon atoms per molecule, the weight ratio of said hydrocarbon to total monomeric material being within the range of 1.0:0.5 to 1:10, and continuing the polymerization until at least 90 per cent of the total monomeric material is polymerized thereby producing an essentially gel-free high conversion synthetic rubber latex.

2. A process according to claim 1 wherein the polymerization mixture is free from mercaptan modifier.

3. A process according to claim 1 wherein an aliphatic mercaptan modifier for the polymerization is employed but in a quantity less than that which would be required to produce at the same conversion a rubber of the same Mooney viscosity.

4. A process according to claim 1 wherein sufficient butadiene is added after the start of the polymerization to obtain complete conversion of the styrene present.

5. In the production of synthetic rubber by the polymerization of a monomeric material comprising a conjugated diene having not more than 6 carbon atoms per molecule while dispersed in an aqueous medium in the presence of a catalytic composition comprising an oxidant and a reductant, the improvement which comprises maintaining a polymerization temperature not in excess of 15° C. at all times, carrying the polymerization to a conversion not greater than the value which is 10 per cent (based on total conversion of monomers) less than the percentage conversion at which gel would begin to form, then adding at least one hydrocarbon selected from the group consisting of the aliphatic paraffins and monoolefins containing from 3 to 6 carbon atoms per molecule in a weight ratio to total monomeric material of 1.0:0.5 to 1:10, and continuing the polymerization to a conversion higher than that at which said gel would otherwise form without gel formation occurring.

6. A process which comprises polymerizing at a temperature between $-40°$ C. and $+15°$ C. an aqueous dispersion of a monomeric material comprising a conjugated diene having not more than 6 carbon atoms per molecule, a tri-substituted hydroperoxymethane oxidant and a polyalkylene polyamine reductant, an emulsifying agent, and at least one hydrocarbon selected from the group consisting of the aliphatic paraffins and monoolefins containing from 3 to 6 carbon atoms per molecule in a weight ratio of said hydrocarbon to total monomeric material of 1.0:0.5 to 1:10.

7. A process which comprises polymerizing at a temperature between $-40°$ C. and $+15°$ C. an aqueous dispersion of a monomeric material comprising a conjugated diene having not more than 6 carbon atoms per molecule, a tri-substituted hydroperoxymethane oxidant and a heavy metal salt containing reductant, an emulsifying agent, and at least one hydrocarbon selected from the group consisting of the aliphatic paraffins and monoolefins containing from 3 to 6 carbon atoms per molecule in a weight ratio of said hydrocarbon to total monomeric material of 1.0:0.5 to 1:10.

8. A process according to claim 7 wherein said reductant comprises iron pyrophosphate.

9. In a process for the production of synthetic rubber by the polymerization of a monomeric material comprising an organic compound having an active $CH_2=C<$ group and polymerizable to synthetic rubber and at polymerization conditions including a temperature not in excess of 15° C. while dispersed in an aqueous medium in the presence of an oxidant-reductant catalyst composition effective at said conditions, the improvement which comprises effecting said polymerization in the presence of sufficient hydrocarbon selected from the group consisting of the aliphatic paraffins and monoolefins containing from 3 to 6 carbon atoms per molecule to reduce significantly the quantity of mercaptan modifier required to produce a rubber of given Mooney viscosity.

10. A process according to claim 9 wherein the weight ratio of said hydrocarbon to total monomeric material is within the range of 1.0:0.5 to 1:10.

11. A process according to claim 9 wherein said hydrocarbon is normal butane.

12. A process according to claim 9 wherein said hydrocarbon is isobutane.

13. A process according to claim 9 wherein said hydrocarbon is isobutylene.

14. A process according to claim 9 wherein said hydrocarbon is 1-butene.

References Cited in the file of this patent

UNITED STATES PATENTS

| Number | Name | Date |
|---|---|---|
| 2,234,204 | Starkweather et al. | Mar. 11, 1941 |
| 2,400,578 | Vanderbilt | May 21, 1946 |
| 2,444,643 | Fryline | July 6, 1948 |
| 2,459,126 | Clifford | Jan. 11, 1949 |

OTHER REFERENCES

Shearon et al., Ind. and Eng. Chem., vol. 40, No. 5, May 1948, pages 769–777.

Marvel et al., Jour. Amer. Chem. Soc., vol. 72, No. 5, May 1950, pp. 2289–90.

Livingston C. I. O. S. Target No. 2 2/2 June 30, 1945.